Patented Jan. 12, 1932

1,841,342

UNITED STATES PATENT OFFICE

JAN TEPPEMA, OF AKRON, OHIO, ASSIGNOR TO THE GOODYEAR TIRE & RUBBER COMPANY, OF AKRON, OHIO, A CORPORATION OF OHIO

ANTIOXIDANT OR AGE-RETARDER

No Drawing.    Application filed November 26, 1928.   Serial No. 322,087.

This invention relates to methods of treating rubber, transformer oils, soaps and similar organic materials, and it has particular relation to processes of preserving such compounds.

One object of the invention is to provide an antioxidant or preservative of organic compounds which does not stain or discolor the materials into which it is introduced, upon exposure to atmospheric conditions.

Heretofore, it has been observed that upon being exposed to atmospheric conditions, rubber goods, transformer oils, soaps and similar organic compounds absorb oxygen from the air, thus resulting in hardening of the materials. It has been proposed to overcome these deleterious effects by introducing into the compounds certain negative catalysts of oxidation known as antioxidants. A relatively large class of materials, such as hydroquinones, secondary amines and reaction products of certain aldehydes with amines, are known to be such negative catalysts. Many of these substances are relatively efficient in black or very dark compounds, but are undesirable in goods of light color, because upon exposure to the air they undergo color changes, thereby imparting undesirable stains to the goods into which they are introduced.

This invention consists in the discovery that certain naphthols, notably the di-naphthols, are quite efficient as antioxidants or preservatives of organic compounds, and do not appreciably stain the compounds upon exposure to the atmospheric conditions.

One notable example of a compound of this class is methylene di-beta-naphthol which may be prepared by causing two molecular proportions of beta-naphthol to react with formaldehyde in the presence of a condensing agent, like soduim acetate. This method is discussed in detail in Berichte, vol. 39, page 439.

The reaction occurring may be represented by the following structural formula:

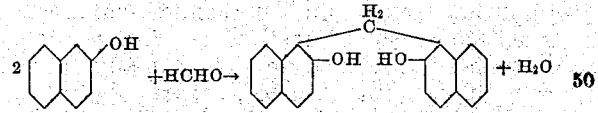

This compound may be employed with satisfactory results in most of the standard rubber formulæ, as well as in transformer oils, soaps and various other organic materials which it may be desirable to preserve from oxidation. The compound is particularly useful in such rubber goods of light color, as flooring tiles in which it is highly desirable to obtain a product that is not appreciably affected by long exposure to air and light and which is not discolored by these agencies. The following is an example of a formula which may be employed to manufacture rubber tiles with excellent results:

| | |
|---|---|
| Pale crepe rubber | 20.00 parts |
| Sulphur | 2.00 parts |
| Lime | 1.00 part |
| Magnesia | 4.00 parts |
| Ground clay | 72.60 parts |
| Stearic acid | 1.50 parts |
| Methylene di-beta-naphthol | .40 part |

Of course, it is to be understood that the above proportions are merely exemplary, and relatively wide departure may be made from the exact proportions given without creating a great change in the character of the product.

To test the efficiency of the new material as an antioxidant, control samples of material containing no antioxidant and also similar samples of material containing from one to two percent of methylene di-beta-naphthol were placed in an oxygen bomb, and were maintained at a temperature of 50° C., under a pressure of 150 pounds per square inch oxygen pressure for a period of six days. At the end of this time, it was found that the control samples containing no antioxidant were severely oxidized to a depth of approximately $\frac{1}{32}$ of an inch. This oxidized surface coating was relatively brittle and practically devoid of elasticity, so that it broke upon slight flexure. On the other hand, samples of material containing methylene di-beta-naphthol as a preservative were in practically as good condition physically as when placed in the bomb. Also, the color of the tiles was but slightly changed during the prolonged period of artificial aging. In order further to test the permanency of the color of the product, samples of tiles containing the new antioxidants were subjected to the action of sunlight for several weeks. The color of the samples was substantially unchanged by this treatment. Under similar conditions, samples of rubber containing antioxidants heretofore known are so stained by the action of the oxygen upon the antioxidant that they are unfit for commercial use.

Although only methylene di-naphthols have been discussed in detail, many other compounds of the same general class have similar antioxidant properties and may be substituted therefor in the usual rubber formulæ. Butyraldehyde, crotonaldehyde, acetaldehyde and benzaldehyde have all been reacted with naphthols, for example beta-naphthol, and the reaction products have in each instance been found to possess antioxidant properties.

Although I have described in detail only one embodiment of the invention, it will be apparent to those skilled in the art that it is not so limited but that various modifications may be made therein without departing from the spirit of the invention or from the scope of the appended claims.

What I claim is:

1. A method of preserving organic compounds which comprises introducing therein a substance having the formula

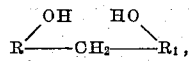

in which R and R₁ are naphthalene groups.

2. A method of preserving organic compounds which comprises introducing therein a reaction product of naphthol and an aldehyde.

3. A method of preserving rubber which comprises vulcanizing it in the presence of a material having the structural formula

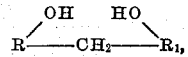

in which R and R₁ represents naphthalene groups.

4. A method of preserving rubber which comprises incorporating therein a reaction product of a naphthol and formaldehyde.

5. A method of preserving rubber which comprises subjecting it to vulcanization in the presence of a reaction product of beta-naphthol and formaldehyde.

6. A method of preserving rubber which comprises subjecting it to vulcanization in the presence of methylene di-beta-naphthol.

7. A method of preserving rubber which comprises subjecting it to vulcanization in the presence of an alkylidene di-naphthol.

8. A rubber product that has been vulcanized in the presence of a material having the following structural formula:

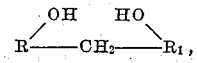

in which R and R₁ represent naphthalene groups.

9. A rubber product that has been vulcanized in the presence of a reaction product of a naphthol and an aldehyde.

10. A rubber product that has been vulcanized in the presence of a reaction product of a naphthol and formaldehyde.

11. A rubber product that has been vulcanized in the presence of a reaction product of beta-naphthol and an aldehyde.

12. A rubber product that has been vulcanized in the presence of a reaction product of beta-naphthol and formaldehyde.

13. A method of preserving rubber tiles which comprises vulcanizing them in the presence of methylene di-naphthol.

14. A method of treating rubber which comprises subjecting it to vulcanization in the presence of a material having the formula

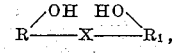

where R and R₁ are naphthalene groups and X is an aliphatic hydrocarbon residue, said material being substantially a non-accelerator of vulcanization.

15. A rubber product that has been vulcanized in the presence of a material having the formula

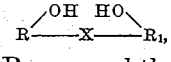

wherein R and R₁ are naphthalene groups and X is an aliphatic residue.

In witness whereof, I have hereunto signed my name.

Signed at Akron, in the county of Summit and State of Ohio, U. S. A., this 23rd day of November, 1928.

JAN TEPPEMA.